Figure 1:
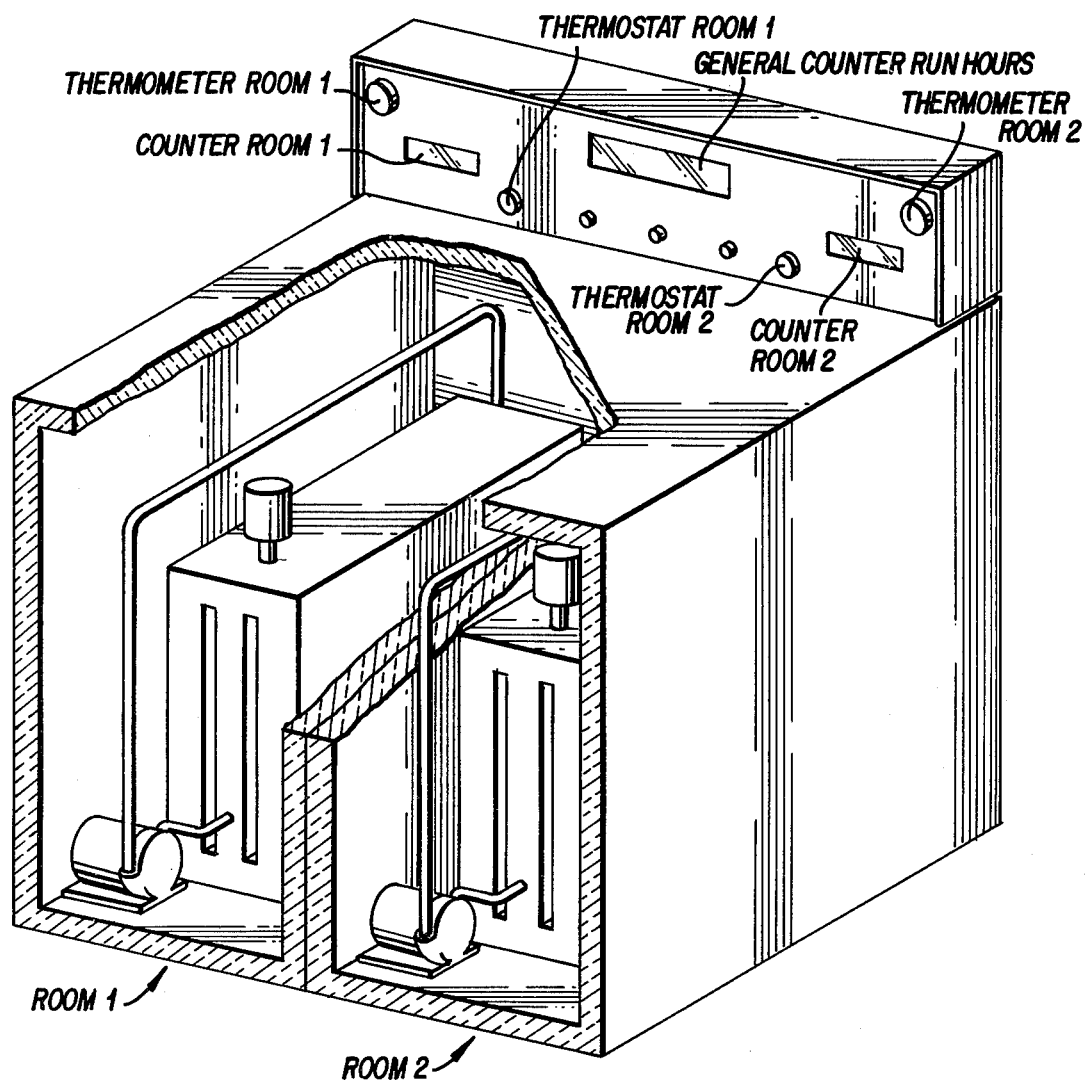

United States Patent [19]

Pittaluga

[11] 4,454,053

[45] Jun. 12, 1984

[54] ADDITIVE FOR THE WATER CIRCULATING IN CIVIL AND INDUSTRIAL HEATING PLANTS

[75] Inventor: Pietro Pittaluga, Genoa, Italy

[73] Assignee: T.P. System S.a.s. di Pittaluga Giuseppe & C., Genoa, Italy

[21] Appl. No.: 472,476

[22] Filed: Mar. 7, 1983

Related U.S. Application Data

[63] Continuation-in-part of Ser. No. 343,167, Jan. 27, 1982, abandoned.

[51] Int. Cl.³ ............................ C09K 3/02; C09K 3/12
[52] U.S. Cl. ......................................... 252/71; 252/72;
106/171; 106/189; 106/197 C; 106/208;
524/389; 524/28; 524/45; 432/27; 432/30
[58] Field of Search .................... 524/28, 45, 315, 389;
106/170, 171, 187, 189, 197 C, 206, 208;
432/27, 30; 252/71, 72

[56] References Cited

U.S. PATENT DOCUMENTS

| | | | |
|---|---|---|---|
| 2,264,362 | 12/1941 | Clapsadle | 252/72 |
| 2,264,363 | 10/1945 | Clapsadle et al. | 252/72 |
| 2,264,387 | 10/1945 | Lamprey | 252/72 |
| 2,264,388 | 10/1945 | Lamprey | 252/72 |
| 2,685,914 | 7/1954 | Heiss | 106/197 |
| 3,481,889 | 12/1969 | Gibson | 524/27 |
| 3,630,914 | 12/1971 | Nankee et al. | 252/72 |
| 3,640,741 | 2/1972 | Etes | 106/170 |
| 3,984,507 | 10/1976 | Miller | 252/72 |
| 4,302,341 | 11/1981 | Watson | 252/8.55 R |

FOREIGN PATENT DOCUMENTS

| | | | |
|---|---|---|---|
| 2057577 | 5/1971 | France . | |
| 386328 | 1/1933 | United Kingdom | 524/28 |

OTHER PUBLICATIONS

Hollabaugh, C. B., Hurt, Leland H., and Walsh, Anna Peterson, *Carboxymethylcellulose, Uses and Applications*, Reprinted from "Industrial and Engineering Chemistry", vol. 37, pp. 943–947, Oct. 1945.

*Primary Examiner*—Morton Foelak
*Assistant Examiner*—Nathan M. Nutter
*Attorney, Agent, or Firm*—Stevens, Davis, Miller & Mosher

[57] ABSTRACT

This invention is relevant to a method for saving fuel in heating plants which utilize thermal energy obtained through combustion of fuel in a boiler and in which the heat transfer medium is circulating water, said method consisting of mixing the circulating water with aqueous solution or homogeneous dispersion of a salified polymeric substance selected from amongst polymers and copolymers of acrylic or methacrylic acid, carboxymethylcellulose, alginates.

4 Claims, 1 Drawing Figure

ADDITIVE FOR THE WATER CIRCULATING IN CIVIL AND INDUSTRIAL HEATING PLANTS

This application is a continuation-in-part of application Ser. No. 343,167, filed Jan. 27, 1982, now abandoned.

The present invention relates to a particular additive to be added to the water circulating in heating plants in order to reduce the consumption of fuel and to better utilize the thermal energy.

We have ascertained that the starting and blowing-out times of the same heating plant, in which once was circulated water and once liquid (water with additive) according to the present invention, were remarkably different, other operational conditions being the same. In fact we have found that in the heating of a plant containing water and the additive in suitable proportion, the burner (automatically controlled by a thermostat) remains blown-out for a longer time than when the plant contains water alone.

The additive according to the invention comprises an aqueous solution or homogeneous dispersion of a salified polymer or copolymer of acrylic or methacrylic acid, a salified alginate (alkaline alginate), or a carboxymethyl cellulose such polymeric substance being largely known on the market as "thickener agents".

Particularly good results are obtained with salified polymers and copolymers of acrylic or methacrylic acid in aqueous solutions having pH between 8 and 9, such as the product Densomol, a trade name of Montedison.

Further we have found that the aqueous solution or dispersion as above defined is compatible with the ethylene glycol and with other alcohols known in particular as antifreezes.

It is essential that the polymeric substance is completely solubilized in the liquid consisting mainly of water or is homogeneously dispersed in the same.

Some additives commonly used in water circulating in heating plants such as antifreezes, anticorrosives and so on, could compromise the solubility of some salified polymeric substances ("thickener agent") used according to the present invention. The addition of butyl alcohol and particularly of isopropyl alcohol, allows a better solubilization of the polymeric substance, surprisingly affording further reduction in energy requirement.

A small amount, say 0.1-1% of ammonia may be advantageously added to the additive to regulate the pH between 7 and 9 and react with chlorine if chlorine is present in the water. In such conditions we have found that the obnoxious effects of chlorine, which tend to block the reduction of the heating plant energy consumption, are overcome.

A small amount, e.g. 0.1-1%, of formaldehyde may be added, as a bactericide, and the same amount of a sequestrant, such as polyphosphate or the ethylenediamine tetracetic acid sodium salt may be used. Other substances such as antirust agents, surfactants, anti-foam agents and also others may be added.

Hereinafter we report the composition ranges of the circulating liquid treated with the additive of the invention:

| | |
|---|---|
| Salified polymeric substance ("thickener agent") | 0.025–0.25% by w. (as dry substance, or 0.2–2% as concentrated aqueous solution at 12%) |
| Isopropyl alcohol | 0–0.35% |
| Ethylene glycol | 0–0.2% |
| Formaldehyde | 0–0.025% |
| Ammonia | 0–0.025% |
| Ethylenediamine tetracetic acid sodium salt | 0–0.025% |
| Anti-foam | 0–0.025% |
| Water, balance to 100%. | |

The amount of ethylene glycol may be further increased if it is wished to further lower the freezing point of the additive and water mixture.

Preferably the additive, for transport economy, may be sold as a concentrated aqueous viscous solution, containing said salified polymeric substance, ethylene glycol, isopropyl alcohol, ammonia, formaldehyde and the ethylenediamine tetracetic acid sodium salt, having e.g. the following composition in parts by weight (p.b.w.):

| | | |
|---|---|---|
| "thickener agent" (salified polymeric substance in aqueous solution at 12% by w.) | p.b.w. | 80 |
| Isopropanol | p.b.w. | 12 |
| Ethylene glycol | p.b.w. | 4 |
| Ammonia | p.b.w. | 0.15 |
| Formaldehyde | p.b.w. | 0.2 |
| Ethylenediamine tetracetic acid sodium salt | p.b.w. | 0.4 |
| Antifoam | p.b.w. | 0.6 |
| Water, balance to 100 | p.b.w. | |

We have surprisingly discovered that, employing the additive of the present invention in such an amount as to have in the circulating water a content in polymeric agent, generally not higher than 0.25% of the whole quantity of the water contained in a heating plant, one can obtain an energy saving up to about 25%, as shown by the example below.

Furthermore we have ascertained that the energy saving is obtained even in the first operation period of the heating plant. It is well known that some commonly used additives for circulating water such as antirust agents and sequestering agents improve the performance of the heating plant through avoiding formation of rust and scale. Consequently, this sort of improvement is verifiable only after some time of operation.

Numerous experiments have been performed on heating plants of different potential and type, e.g. on plants for the production of sanitary hot water, with heat exchangers, in different localities, and with different fuels, always obtaining a remarkable energy saving.

We do not wish to refer here to the cause which result in said energy saving, but only refer to the results in particular obtained in the following example, which appears particularly illustrative.

EXAMPLE 1

An additive has been prepared by using as polymeric substance an acrylic acid polymer, commercial grade, average molecular weight 150,000, salified with NaOH, in form of an aqueous solution at 12% by w. of polymer and having pH=8.5.

Composition of the additive:

| | |
|---|---|
| aqueous polymer solution above | 70% by w. |
| isopropanol | 12% by w. |
| ethylene glycol | 4% by w. |

| -continued | |
|---|---|
| ammonia | 0.15% by weight |
| formaldehyde at 36% | 0.2% by weight |
| ethylenediamine tetracetic acid sodium salt | 0.4% by weight |
| anti-foam agent | 0.6% by weight |
| water balance to 100% by w. | |

This additive has been mixed with the water circulating in one of the two radiators of the apparatus shown in FIG. 1 and therein after described.

The amount of additive has been 2% by weight, an equal amount of water has been previously discharged. A completely homogeneous solution has been obtained after mixing, having a pH value is 8 and freezing temperature −4° C.

After some minutes of operation, by maintaining the same temperature in both rooms of the test apparatus, it has been determined that the operation time of the burner heating the circuit containing treated water was about 25% less than that of the second burner, that is the consumption of fuel was 25% lower.

This difference in the consumption lasted through the whole experimental run of about 10 hours.

Description of the test apparatus

A scheme of the apparatus is shown in FIG. 1.

Two radiators placed in two rooms are heated by equal amount of circulating liquid.

In the first radiator, the circulating liquid is water. In the second radiator, the circulating liquid is water mixed with the additive to be tested.

Both radiators are fitted with a circulating pump. Each circulating liquid is heated in a boiler by a burner device which is automatically controlled by thermostats taking the temperatures of the room and of the circulating liquid and assuring the same temperature in both rooms.

A central control system fitted out with counters measures the operation time of each burner.

The form and size and the outside ambient (i.e. heat dispersion conditions) being the same for both rooms, the apparatus affords a direct comparison of the fuel requirement (measured through the operation time of both burners) in the case of simple water and of water mixed with the additive.

The perfect equivalence of both systems as regards boilers, burners circulating device, measure devices and so on, was ascertained through cross-control tests.

In each test the starting liqud was not changed during the run.

EXAMPLE 2

The additive described in Example 1 was prepared by using as polymeric substance a methacrylic acid polymer, commercial grade, salified with NaOH, having average molecular weight 250,000 and in the same aqueous solution concentration.

The pH value and freezing temperature of obtained liquid are the same as in Example 1. The comparison test carried out as in Example 1 showed a saving in fuel requirement of about 25%.

EXAMPLE 3

The additive described in Example 1 was prepared by using as polymeric substance a copolymer of acrylic and methacrylic acid having average molecular weight 300,000 the other conditions being the same. The fuel saving is about the same as in example 1.

EXAMPLE 4

The circulating water in test apparatus was mixed only with the aqueous solution of acrylic acid polymer used in Example 1, without any other additive. The amount of aqueous polymer solution was 2% by weight in the circulating water. The pH of obtained liquid was 8 and freezing temperature about 0° C. Notwithstanding this liquid, not containing anti-foam agent, has some tendency to foaming (which could decrease the heat transfer properties), the fuel saving ascertained in test apparatus was 10%.

This example shows that the polymeric substance according to the invention used alone affords a remarkable fuel saving.

The other additives used in Examples 1–3 merely enhance the effect.

EXAMPLE 5

The additive described in Example 1 was prepared by using as polymeric substance a copolymer acrylic acid-/acrylamide salified with NaOH, having average molecular weight 7,000,000.

The additive was mixed (3% by w.) with water obtaining a homogeneous liquid having pH=8 and freezing temperature=−4° C. The fuel saving was about 8%.

EXAMPLE 6

The circulating liquid prepared according to Example 1 was used in a civil heating plant of 350,000 Kcal/h.

The run was carried out in winter time and lasted 90 days. During this experiment it was controlled that the temperature in the flats was the one programmed of 19°–20° C. The thermostat of the boiler of the heating plant was regulated at 80° C. A four way motorized mixing valve was in operation and an external temperature probe was provided together with all the necessary control equipment.

It was found that the external temperature, during the experiment, showed only a very limited change and that it was nearly the same as in the corresponding period of the preceding year. It was ascertained that the consumption of fuel (gas oil) was 64,001 less than in the corresponding period of the year before, in which the circulating liquid was water only. The fuel saving corresponds to 25% of the total consumption.

Comparison tests

In order to prove that the effect (fuel saving) is obtained with the specific polymeric substance according to this invention and not with water soluble polymeric substances in general, some additives were prepared having the same components as in Example 1 with the exception of the polymeric substance which was chosen from amongst: etherified cellulose, oxipropylated guaro, polyglycols.

No reduction in fuel consumption was observed.

I claim:

1. A method for saving fuel in heating plants in which thermal energy is obtained through the combustion of fuel and in which circulating water is used as a heat transfer medium, comprising mixture the circulating water with an aqueous solution or homogeneous dispersion of a salified polymeric substance selected from the group consisting of a salified homopolymer of acrylic acid, a salified homopolymer of methacrylic acid, and a salified copolymer of acrylic acid and methacrylic acid, said salified polymeric substance being dissolved or homogeneously dispersed in the circulating water in an amount sufficient to decrease the necessary amount of heat input to said heat transfer medium as compared to when water alone is used as the heat transfer medium.

2. Method of claim 1, in which there is also added to said circulating water a material selected from the group consisting of anti-foam agents, anti-rust agents, sequestering agents, and antifreezes of the class of glycols and alcohols.

3. Method of claim 1, in which the circulating water is also mixed with the following additives:
   isopropanol: 0–0.35% by w.
   ethylene glycol: 0–0.2% by w.
   formaldehyde: 0–0.025% by w.
   ammonia: 0–0.025% by w.
   ethylenediamine tetracetic acid sodium salt: 0–0.025% by w.
   anti-foam agent: 0–0.025% by w.

4. The method of claim 1, wherein the amount of salified polymeric substances is about 0.025–0.25% by weight of said circulating water.

* * * * *